United States Patent [19]
Durston

[11] Patent Number: 6,067,029
[45] Date of Patent: May 23, 2000

[54] POWER CHECK METER

[76] Inventor: Tom Durston, 1734 Farewell Dr., Bend, Oreg. 97701

[21] Appl. No.: 08/810,420

[22] Filed: Mar. 4, 1997

[51] Int. Cl.$^7$ .................................................. G08C 15/06
[52] U.S. Cl. ............................... 340/870.03; 340/870.02; 340/870.07; 340/657; 379/88; 324/76.11
[58] Field of Search ........................ 340/870.01, 870.02, 340/870.05, 870.07, 870.3, 586, 657; 379/88, 106, 107, 106.1, 106.3; 324/76.11

[56] References Cited

U.S. PATENT DOCUMENTS

| | | | |
|---|---|---|---|
| 4,758,962 | 7/1988 | Fernandes | 340/657 |
| 4,794,327 | 12/1988 | Fernandes | 340/657 |
| 4,851,782 | 7/1989 | Jerring et al. | 324/520 |
| 4,899,217 | 2/1990 | MacFadyen et al. | 358/86 |
| 4,902,965 | 2/1990 | Bodrug et al. | 324/116 |
| 4,933,633 | 6/1990 | Allgood | 324/142 |
| 5,289,115 | 2/1994 | Germer et al. | 324/107 |
| 5,450,007 | 9/1995 | Payne et al. | 324/141 |
| 5,530,738 | 6/1996 | McEachern | 379/88 |

*Primary Examiner*—Michael Horabik
*Assistant Examiner*—Timothy Edwards
*Attorney, Agent, or Firm*—Kevin L. Russell; Chernoff, Vilhauer, McClung & Stenzel, LLP

[57] ABSTRACT

A power measurement system calculates the power flow within a wire to a customer and transmits an indication of the power flow to a remotely located operator. The measurement system includes both a current transformer that senses current within the wire and generates a first output signal and a voltage input that senses voltage within the wire and generates a second output signal. A measurement device receives both the first and second output signals and in response generates a third signal representative of the power flow within the wire. The measurement device includes both a speech encoding circuit that receives the third signal and in response generates a voice signal, and a transmitter that receives the voice signal and transmits the voice signal to the remotely located operator.

18 Claims, 18 Drawing Sheets

POWER CHECK METER

BACKGROUND OF THE INVENTION

The present invention relates to a power check meter, and in particular to a power check meter with improved data transmission characteristics.

Some electrical power customers tap the electrical power line routed to their residence or business at a location prior to their power meter in order to steal electrical power from the utility. To reduce the theft of electrical power many utilities use a portable kilowatt-hour check meter connected to the incoming power line of a suspected dishonest customer to monitor the customer's power usage. The portable check meter is normally installed high on the power pole near the location that the customer's line connects to the utility's main power line. By installing the portable check meter in such a location it is difficult for the customer to tap the incoming line prior to the portable check meter. The utility compares the recorded power usage from both the power meter and the portable check meter during the same time period and notes any difference. If the measurements are significantly different then the utility has confirmed its suspicions and obtained proof that electrical power has been stolen by the customer. The utility then takes corrective measures to ensure that the customer thereafter refrains from stealing electrical power.

Customers that steal electrical power are paranoid of being caught and may notice the utility employees installing the portable check meter on the pole near their location. If the customer notices utility employees installing such equipment, the customer will typically refrain from stealing power for a period of time. During such a time the utility will not be able to detect the theft of power. Traditionally, in order to monitor the customer's power usage, utility employees were required to be in close proximity to the portable check meter's display indicating power usage. This required a utility employee to climb the pole which may alert dishonest customers that their power usage is being monitored and cause the customer to refrain from stealing power until they are confident that their power usage is not being monitored. In addition, it is frequently dangerous for utility employees to be near such dishonest customers, especially if they are involved in illegal drug activities.

In order to alleviate the need for utility employees to be within several feet of the traditional portable check meter to read the power usage, some portable check meters include a radio-frequency transmitter that periodically transmits the power usage. The utility employee uses a radio-frequency receiver to receive and display the transmitted power usage. However, the radio-frequency receiver must still be within approximately 100 to 300 feet to receive the power usage. Accordingly, the utility employee must still get close to the customer which may inadvertently alert the customer that they are being monitored. Also, this may place the utility employee in a dangerous situation. In addition, this requires the utility employee to drive to the vicinity of the transmitter requiring significant time and expense. Further, the utility must obtain a specialized receiver to receive the power usage at additional expense. Such a system is available from Universal Protection Corporation of Atlanta, Ga., known as CMI Diversion Check Meter System.

An alternative portable check meter available from Universal Protection Corporation of Atlanta, Ga., sold under the name CPS I Cellular Phone System, further includes a cellular phone link. A radio-frequency transmitter is used to transmit power usage from the portable check meter to a radio-frequency receiver located in a separate housing. The radio-frequency receiver receives the power usage and in response retransmits the power usage as digital data to the utility using a cellular telephone transmitter. The utility needs a computer, a modem, and specialized software to receive and analyze the digital data from the cellular telephone transmitter. However, the CPS I system requires two separate enclosures to be mounted in the vicinity of the customer which increases the likelihood that the customer will notice the check meter. In addition, the utility is required to use specialized software operating on the computer to receive and analyze the data obtained from the cellular phone transmitter. Further, cellular telephone communications are highly susceptible to dropouts which then require the data to be retransmitted until valid data is received by the utility. The dropouts and potential corruption of the digital data increases the likelihood that the utility will obtain a false reading of the actual power usage.

Portable check meters normally include both a voltage input (or transformer) that is directly connected to the wire to sense voltage and a current transformer that encircles the wire to sense current flowing within the wire. The voltage and current measurements are multiplied together to obtain the power usage. Unfortunately, utility employees periodically install the current transformer in the reverse direction thereby causing the current induced in the current transformer to have the wrong polarity. The improper current polarity may result in the portable check meter calculating an incorrect power usage. If the current transformer is not properly connected to the wire then the utility employee must return to and reconnect the current transformer to the wire with the proper orientation. The utility employee returning to the check meter increases the likelihood that the customer will detect the monitoring of their power usage and also subjects the utility employee to further danger.

What is desired, therefore, is a portable check meter that reduces the likelihood of transmitting false data to the utility. Also, the check meter should eliminate the need for a computer and specialized software to receive and display the power usage while minimizing the amount of equipment installed at the customer. Further, the check meter should minimize the time necessary for installation and ensure that the utility employee orientates the current transformer in the proper direction. In addition, the check meter should reduce the need for utility employees to be in the vicinity of the customer after installation.

SUMMARY OF THE PRESENT INVENTION

The present invention overcomes the aforementioned drawbacks of the prior art by providing an improved power measurement system for calculating the power flow within a wire to a customer and transmitting an indication of the power flow to a remotely located operator. The measurement system includes both a current transformer that senses current within the wire and generates a first output signal and a voltage input that senses voltage within the wire and generates a second output signal. A measurement device receives both the first and second output signals and in response generates a third signal representative of the power flow within the wire. The measurement device includes both a speech encoding circuit that receives the third signal and in response generates a voice signal, and a transmitter that receives the voice signal and transmits the voice signal to the remotely located operator.

The use of the voice signal in the present invention operates on the basis of relying on the recognition of the human brain to understand voice or speech, even if slightly or severely distorted by limitations in cellular telephone transmission technology. If a few bits are dropped in the voice pattern or a dropout occurs, the speech pattern is still recognizable by the utility employee.

In the preferred embodiment the measurement also includes internal circuitry that detects the polarity of the current transformers. This involves detection of the duration which the voltage and current signals have the same and different polarities. If the voltage and current signals over a cycle have different polarities more than they have the same polarity then the internal circuitry reverses the polarity of the current transformer. This assures that the polarity of the current transformer is proper, regardless of the orientation in which it was installed.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
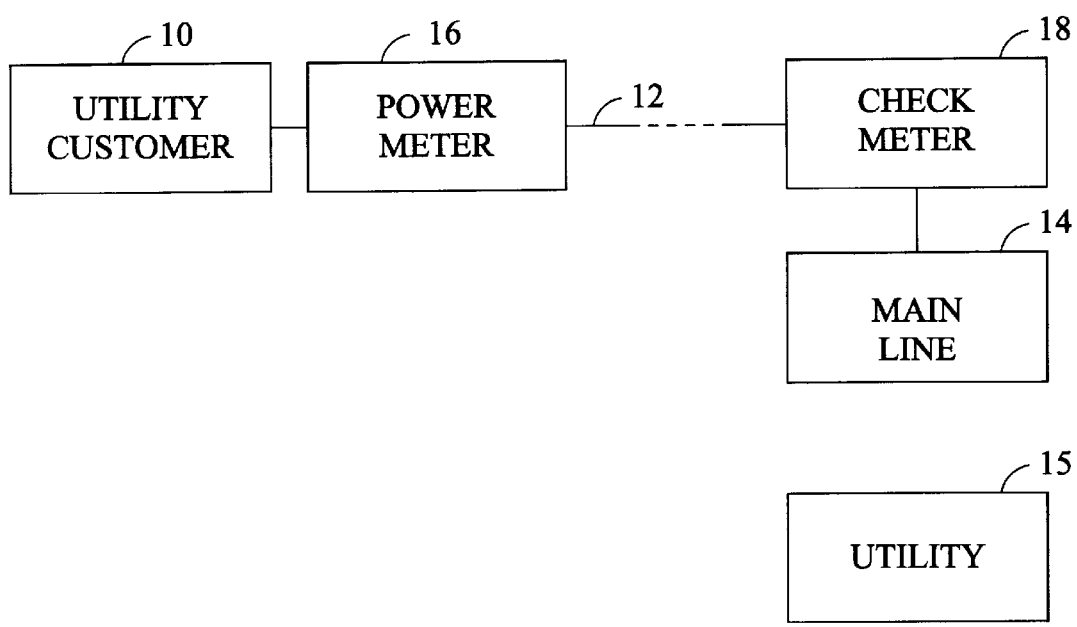
FIG. 1 is a block diagram of a power distribution system to a customer, including a power measurement system.

Referring to FIG. 1, a utility customer 10 has an incoming power line 12 which normally includes two hot wires and a common wire. The power line 12 is typically connected to a main line 14 at a utility pole which belongs to a power utility 15. A standard power meter 16 is located adjacent to the customer 10 in order to determine the customer's power usage for periodic billing purposes. If the utility 15 suspects that the customer is stealing power then the utility 15 installs a check meter 18 on the utility pole to monitor the customer's power usage. Unfortunately, the installation of the check meter 18 may alert the customer 10 that the utility is monitoring their power usage, and subject utility employees to danger during installation and subsequent adjustment of the check meter 18.

Figure 2:
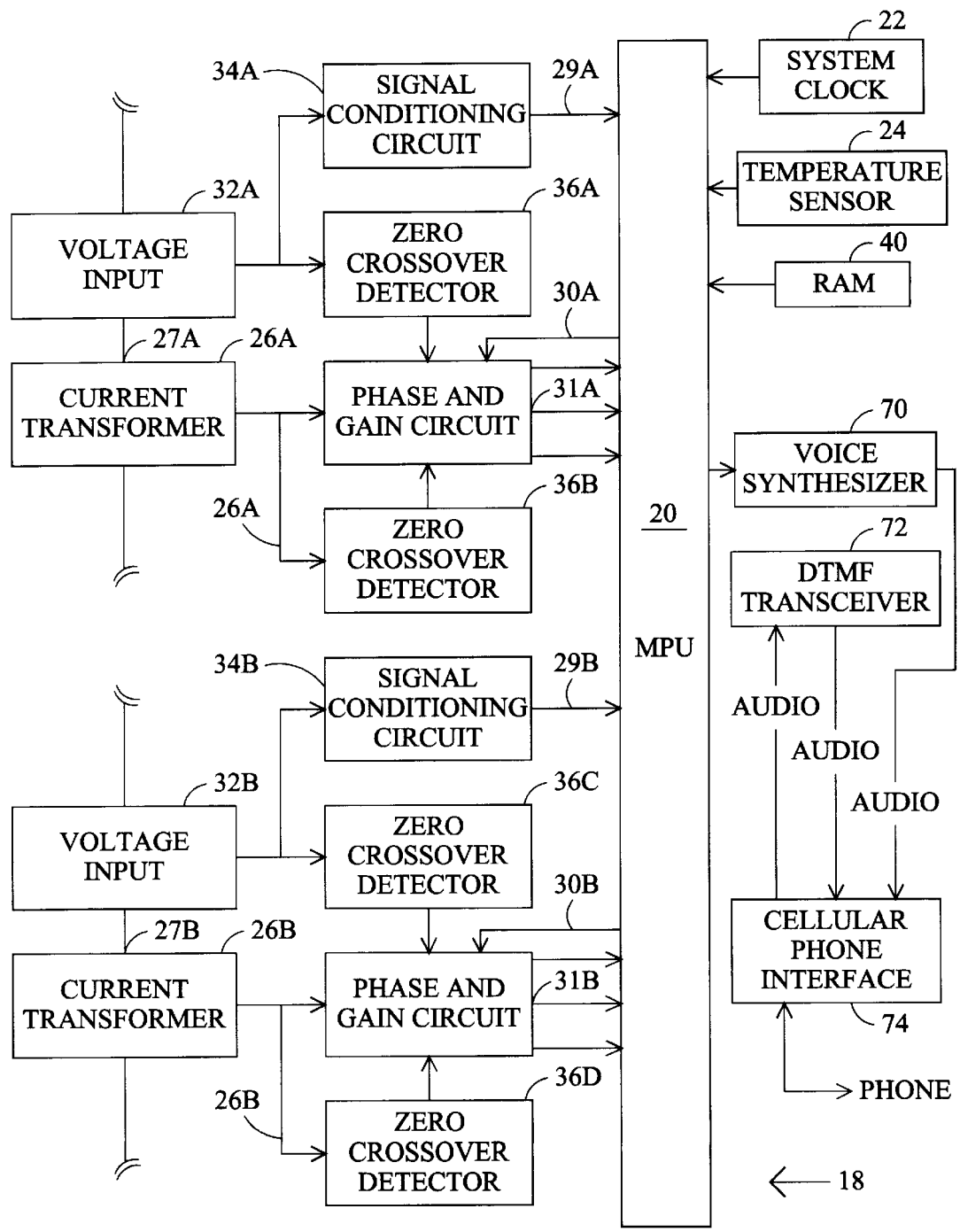
FIG. 2 is a block diagram of an exemplary embodiment of the power measurement system of the present invention, including a phase and gain circuit.

Referring to FIG. 2, the check meter 18 of the present invention includes a microprocessor 20. The microprocessor 20 is preferably a Motorola MC68HC711E9 which includes internal analog-to-digital and digital-to-analog converters. A system clock 22 provides a clock signal to the microprocessor 20. A temperature sensor 24 allows the check meter 18 to provide the utility 15 with temperature measurements and also internal temperature compensation for the electronics within the check meter 18.

A pair of split core current transformers 26a and 26b sense the current level within the respective hot wire 27a and 27b of the power line 12, and in response each current transformer 26a and 26b generates an output voltage proportional to the current level within the respective wire 27a and 27b. The current transformers 26a and 26b may be any type of device that senses the current flowing in a wire. A respective phase and gain circuit 28a and 28b receives the output voltage from the respective current transformer 26a and 26b. The microprocessor 20 through lines 30a and 30b adjusts the voltage gain of respective phase and gain circuits 28a and 28b. The gain values are set during calibration of the check meter 18. In addition, the phase and gain circuits 28a and 28b rectify the received voltage signals. The microprocessor 20 and the phase and gain circuits 28a and 28b determine if the phase of each of the sensed current signals is correct, as described later. Rectified analog voltage outputs 31a and 31b from the respective phase and gain circuits 28a and 28b are representative of the current level within the respective wire 27a and 27b.

A pair of voltage inputs (or voltage transformers) 32a and 32b are connected to the respective wire 27a and 27b. The voltage inputs 27a and 27b are preferably clips connected directly to the respective wire 27a and 27b. A pair of signal conditioning circuits 34a and 34b amplify, rectify, and filter the voltage output from the respective voltage inputs 32a and 32b. The voltage output 29a and 29b of each of the signal conditioning circuits 34a and 34b is a rectified analog voltage representative of the voltage level within the respective wire 27a and 27b. The rectified analog voltage outputs from both the signal conditioning circuits 34a and 34b and the phase and gain circuits 28a and 28b are sampled and converted by analog-to-digital converters within the microprocessor 20 to a set of digital values for further processing. A nonvolatile RAM 40 stores sampled data and other suitable data for the check meter 18.

Zero volt crossover detector circuits 36a, 36b, 36c, and 36d detect the zero crossover of each of the respective input voltage signals that may be used to determine the start of each period of the current and voltage waveforms within the wires 27a and 27b by the microprocessor 20. The current and voltage waveforms within the wires 27a and 27b are generally periodic.

To determine the customer's power usage, each of the respective sampled voltage signals from the voltage inputs 32a and 32b and current transformers 26a and 26b are multiplied together to obtain a set of instantaneous power measurements (Power=Current*Voltage). The instantaneous power measurements obtained during a period of time, such as one cycle, are summed together to obtain the power usage per unit time. The period of the cycle may be determined based on the outputs from the crossover detectors 36a–36d or a timing sequencer 56, described later. Unfortunately, the polarity of the output voltage from one or more of the current transformers 32a and 32b may have the incorrect polarity if improperly connected to the respective wire 27a and 27b by the utility employee. If one or both of the current transformers 32a and 32b is improperly connected, the utility employee previously had to return to the check meter 18 to reverse the orientation of the current transformer which adds expense to the surveillance, may jeopardize the secrecy of the surveillance, and may place the utility employee in further danger.

The combination of the crossover detectors 36a–36d, the phase and gain circuits 28a and 28b, and the microprocessor 20, collectively determine if the polarity of the output voltages from the current transformers 32a and 32b are correct.

Figure 3:
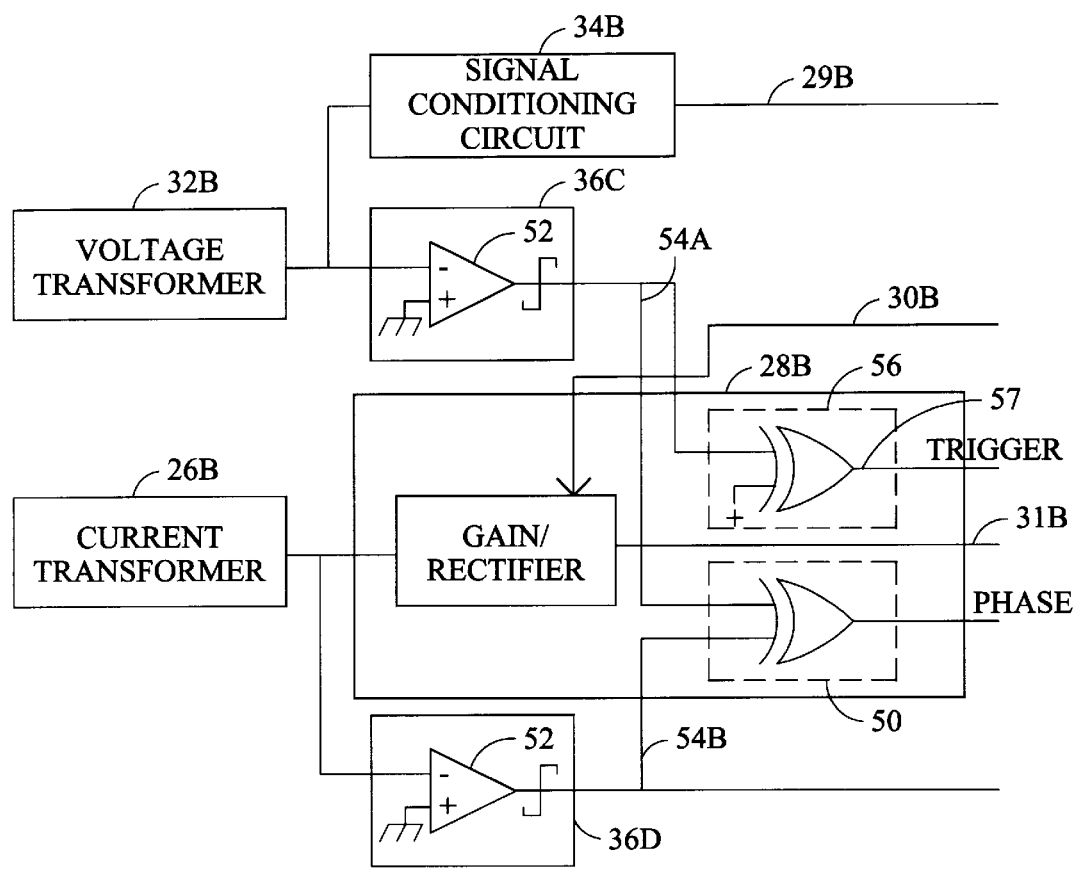
FIG. 3 is a block diagram detailing the phase and gain circuit of FIG. 2.

Referring to FIG. 3, each of the crossover detectors 36a–36d is principally a voltage comparator 52 that produces a positive voltage output (logical 1) when its inverting input voltage is negative and produces a negative voltage output (logical 0) when its inverting input voltage is positive. Each of the phase and gain circuits 28a and 28b includes a phase circuit 50 and the timing sequencer 56. One phase and gain circuits will be described for one wire with the other being the same. The positive and negative rectangular waveforms from the crossover circuits 36c and 36d are the input voltage waveforms 54a and 54b to the phase detector 50. The phase detector 50 is preferably an XOR gate (exclusive OR), and produces the following outputs:

| Voltage Input Comparator 36c Output | Current Transformer Comparator 26d Output | Phase Detector 50 Output |
| --- | --- | --- |
| High Volts ("1") | High Volts ("1") | Low Volts ("0") |
| High Volts ("1") | Low Volts ("0") | High Volts ("1") |
| Low Volts ("0") | High Volts ("0") | High Volts ("1") |
| Low Volts ("0") | Low Volts ("0") | Low Volts ("0") |

Figure 4:
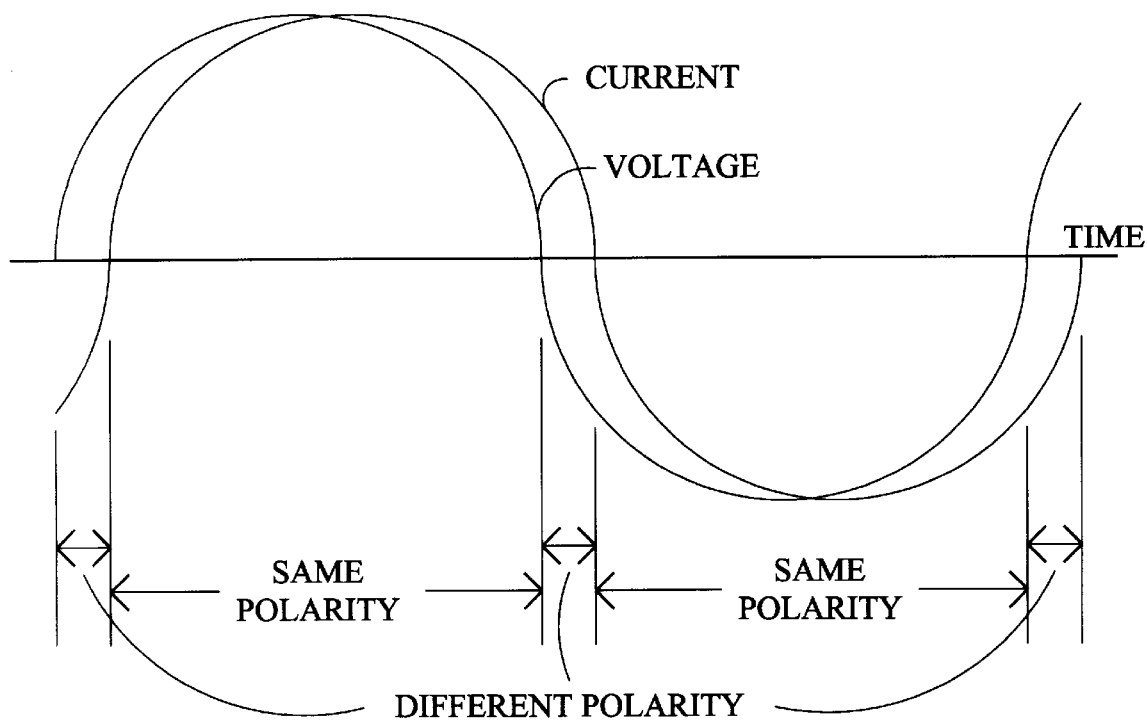
FIG. 4 is a graphical representation of current and voltage signals within a wire indicating the duration that the voltage and current signals have the same and different polarities.

The output waveform from the phase detector 50 has a zero basis value (low volts) when both the voltage inputs have the same polarity. This indicates that the current and voltage in the respective wire have the same polarity. An output waveform with a (high) logic 1 voltage, indicated by a logic 1 or positive voltage pulse, indicates the time during which both the voltage and current signals do not have the same polarity. The duration which the current and voltage signals have the same and different polarities is illustrated in FIG. 4.

The total power is the summation of each of the instantaneous power calculations where the voltage and current signals have the same polarity as indicated by the phase detector output 50 having a low voltage, from which the instantaneous power calculations are subtracted where the polarity of the voltage and current signals are different as indicated by the phase detector output 50 having a high output. This provides the correct total power value over a period of time.

To determine if the current transformers are providing signals with the proper polarity, the microprocessor 20 determines if during a cycle there are more low voltage outputs from the phase detector 50 indicating the current and voltage have the same polarity than the total high voltage outputs from the phase detector 50 indicating that the current and voltage have different polarities. If this is the case, then the microprocessor 20 knows that the current transformer is properly oriented. Otherwise, the microprocessor 20 automatically corrects the polarity of the current transformer by logically inverting (reversing) the phase indication values from the phase detector 50. This alleviates the previous need for utility employees to return to the check meter 18 and reorient the current transformer. The aforementioned power calculation technique is especially useful when the microprocessor 20 samples rectified signals, as in the present check meter 18, because rectified signals do not contain polarity information. The phase detector 50 is preferably an XOR gate.

The timing sequencer 56 receives the output from the voltage crossover detector 36c and generates an output trigger signal 57 that indicates the start of each cycle of the generally periodic voltage waveform within the wire. The timing sequencer 56 identifies each cycle of the input signal so that each cycle can be identified and sampled individually.

Figure 5:
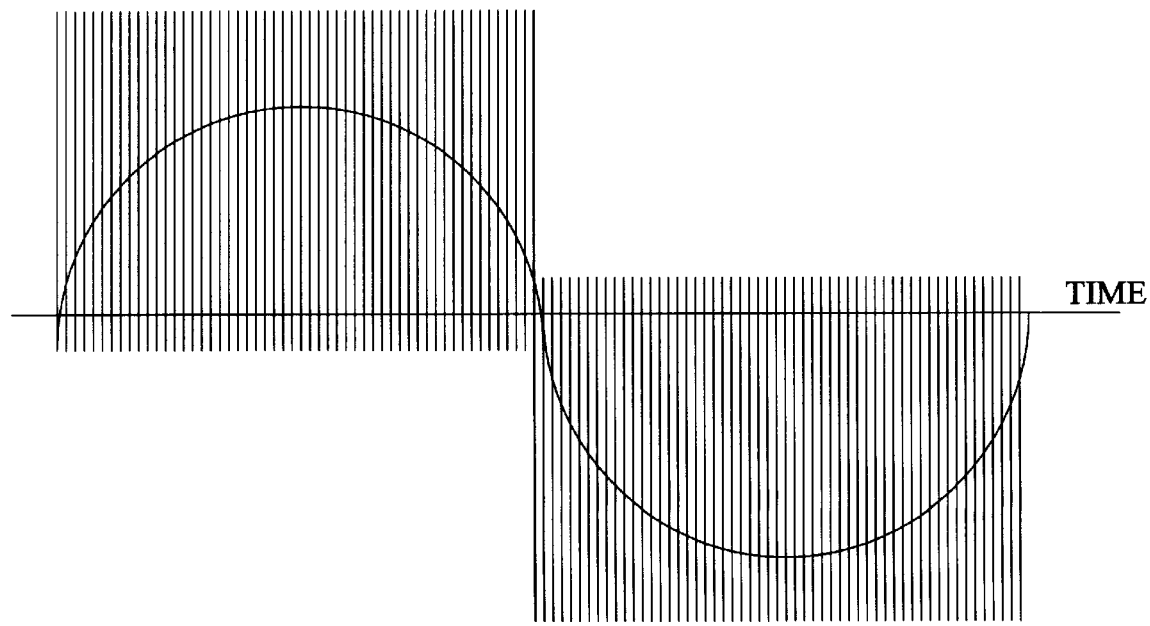
FIG. 5 is a graphical representation of the sampling of a current or voltage waveform over one cycle.
Figure 6:
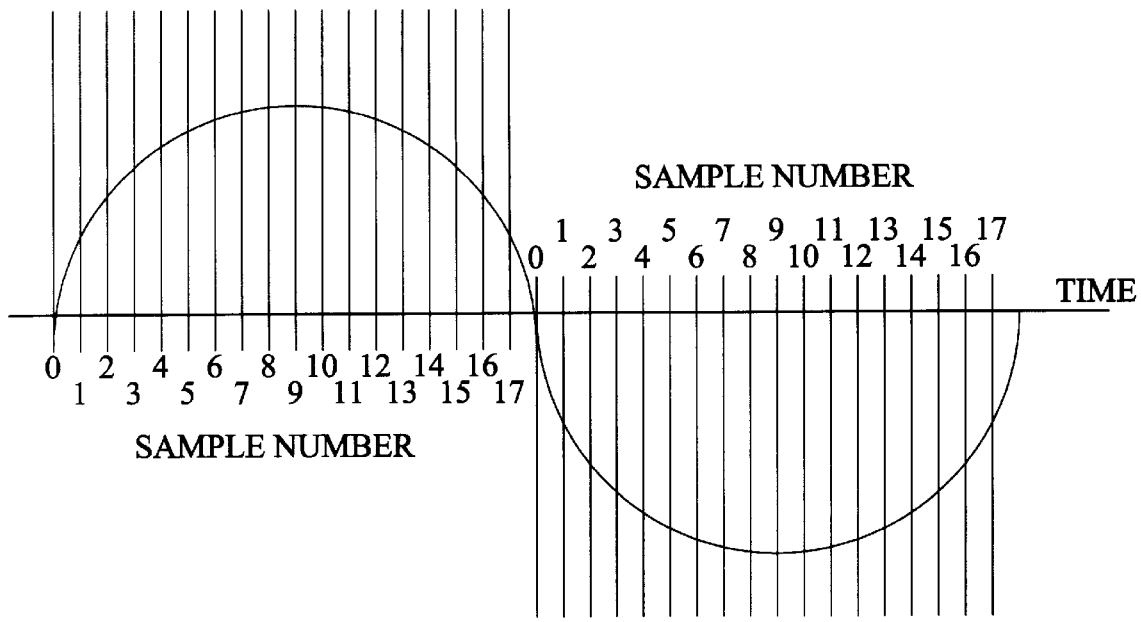
FIG. 6 is a graphical representation of partial sampling of the current or voltage waveform of FIG. 5.
Figure 7:
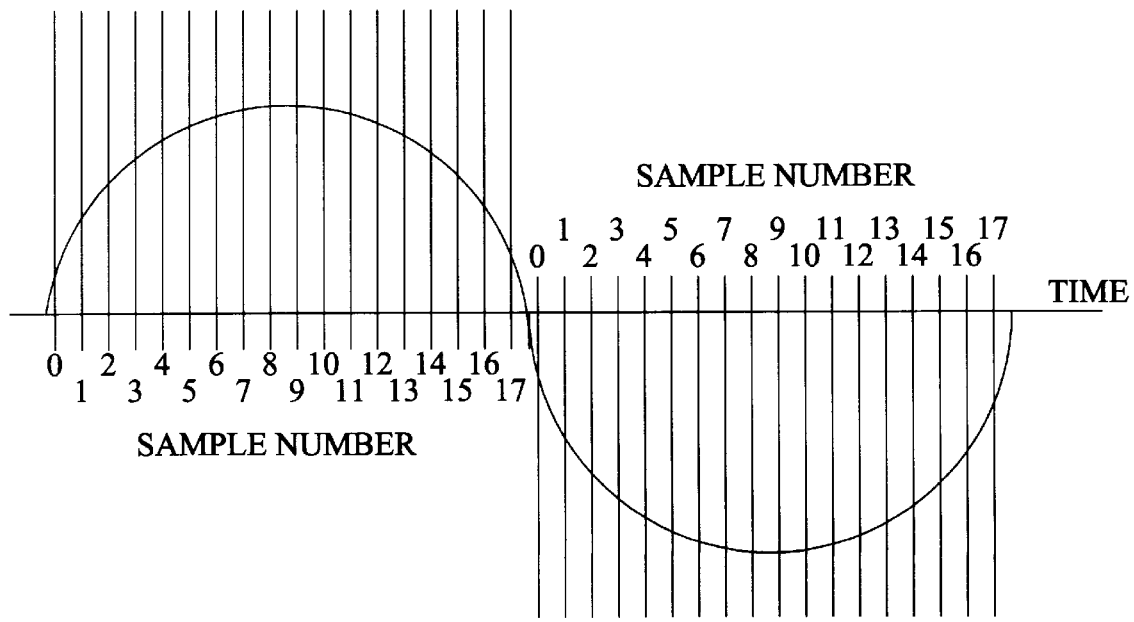
FIG. 7 is a graphical representation of further partial sampling of the current or voltage waveform of FIG. 5 shifted slightly forward in time from the sampling of FIG. 6.
Figure 8:
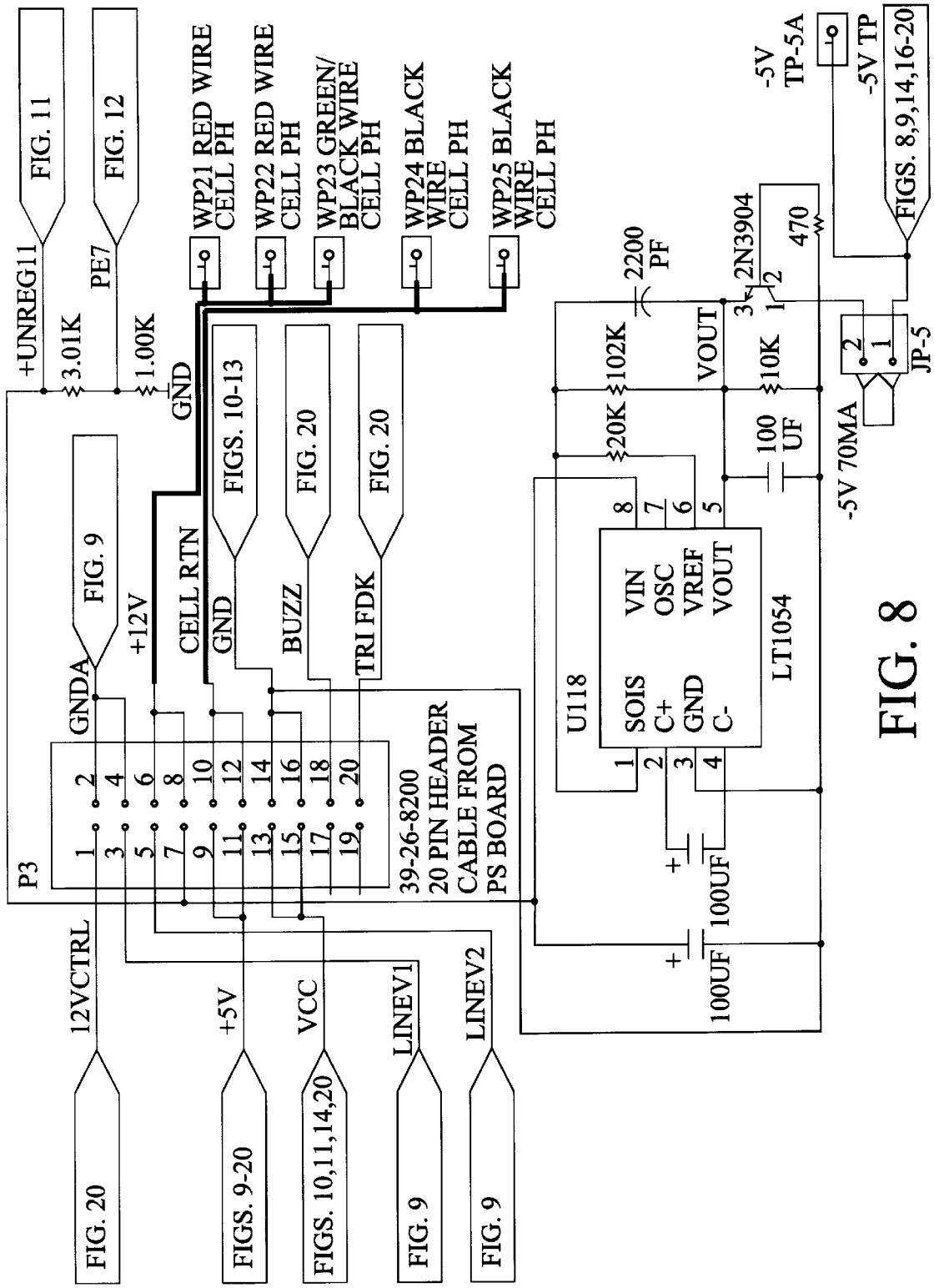
FIGS. 8 to 20 are circuit diagrams of the preferred embodiment of the power measurement system of FIG. 2.
Figure 9:
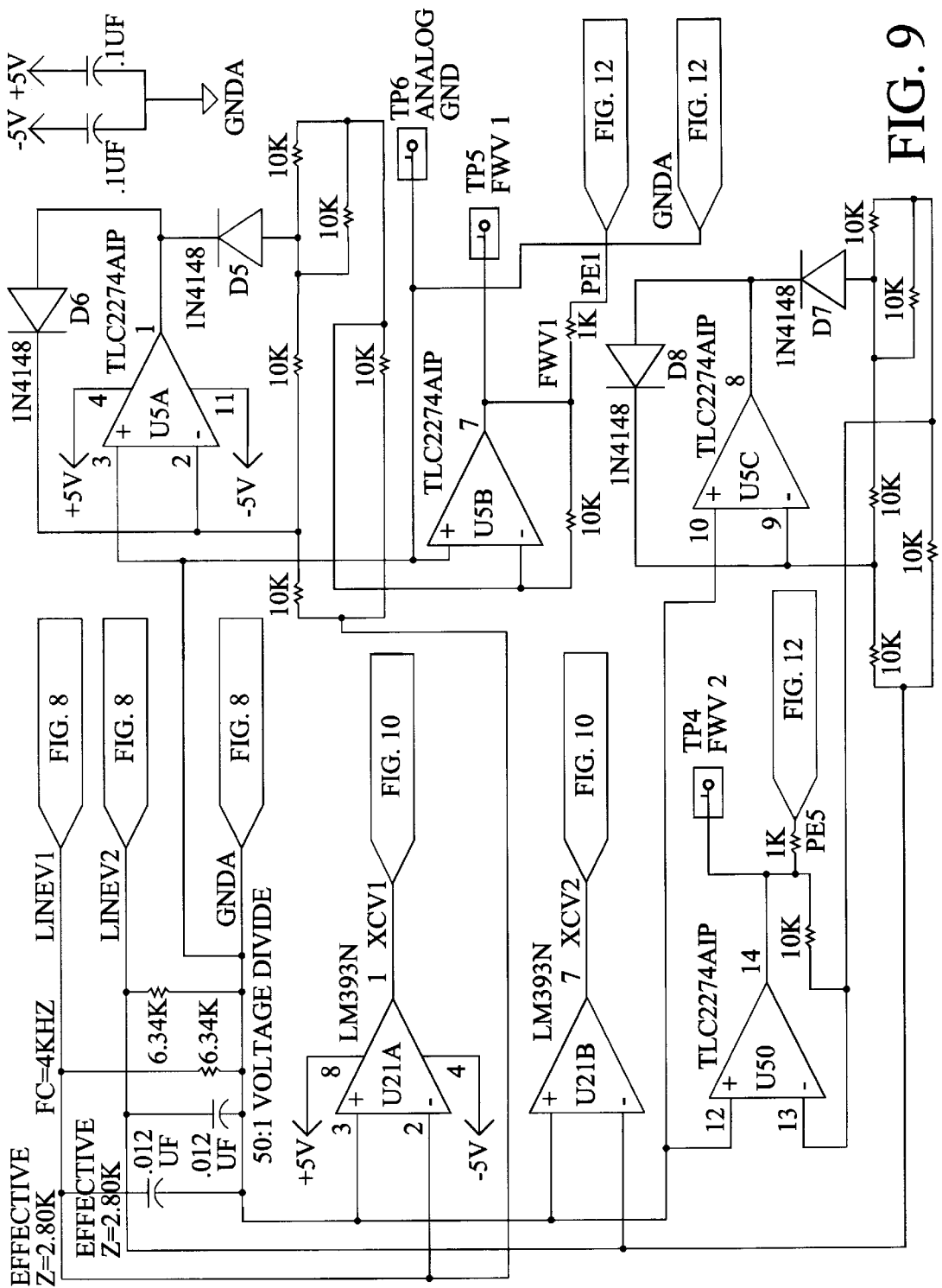
Figure 10:
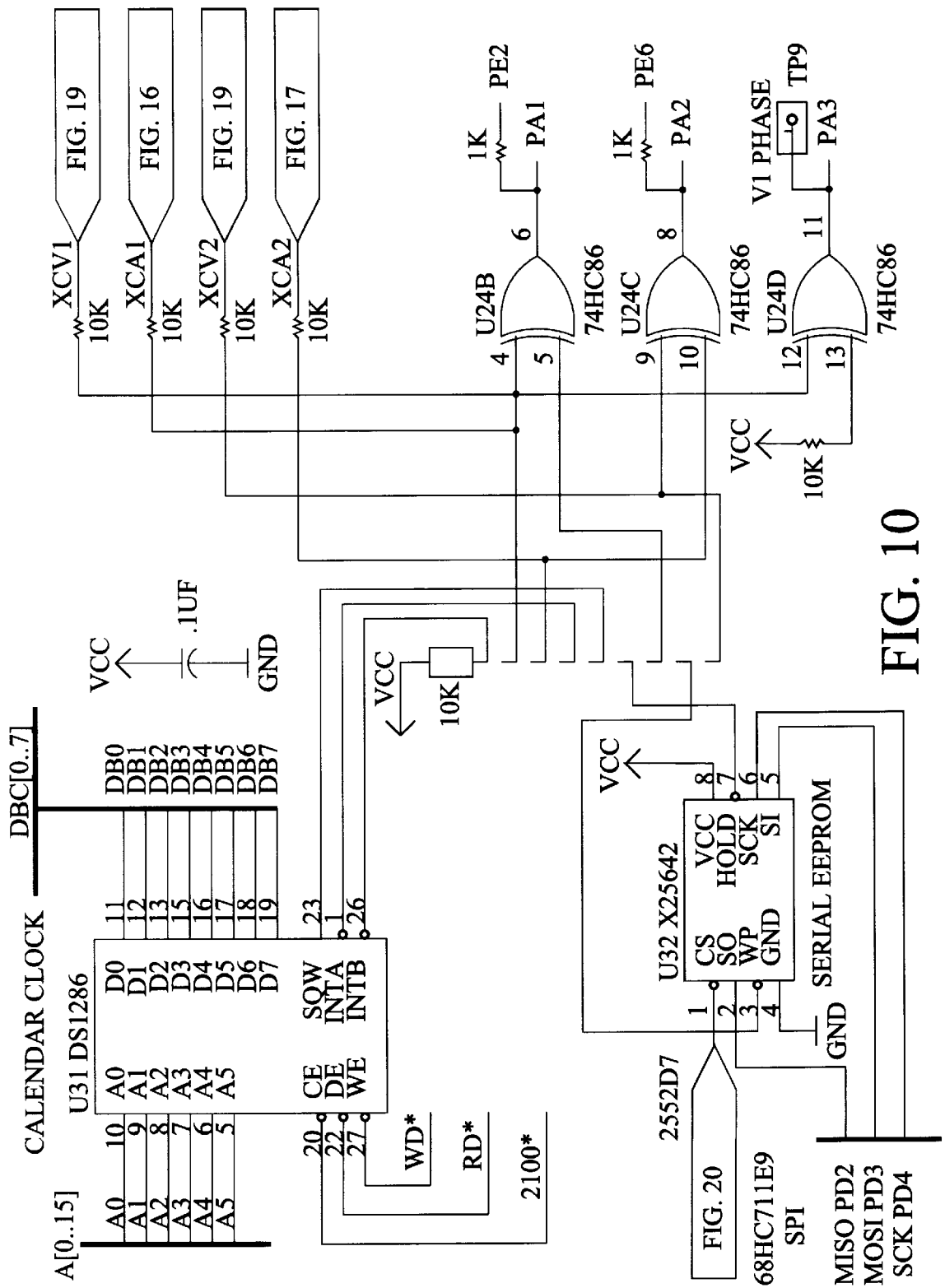
Figure 11:
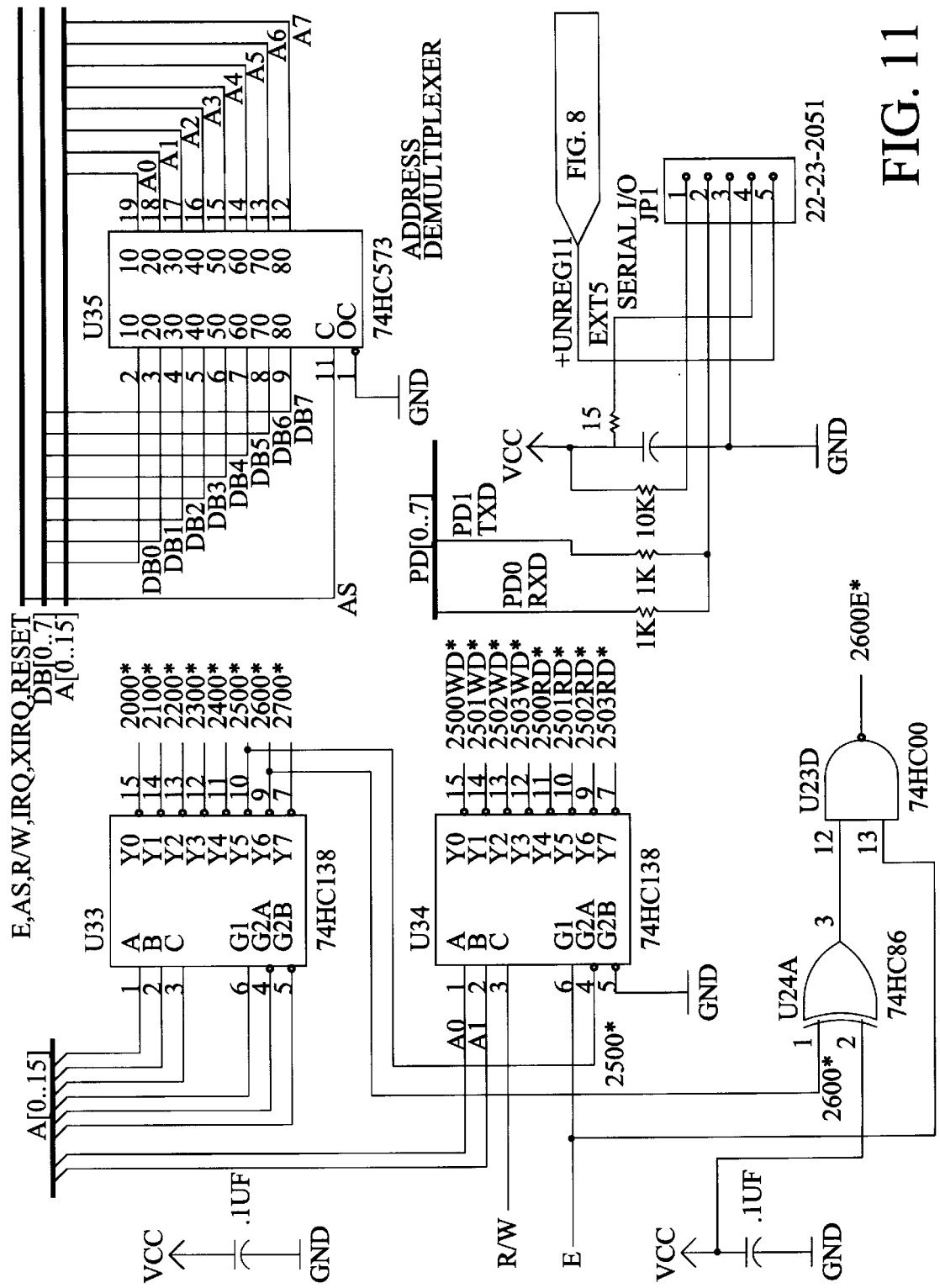
Figure 12:
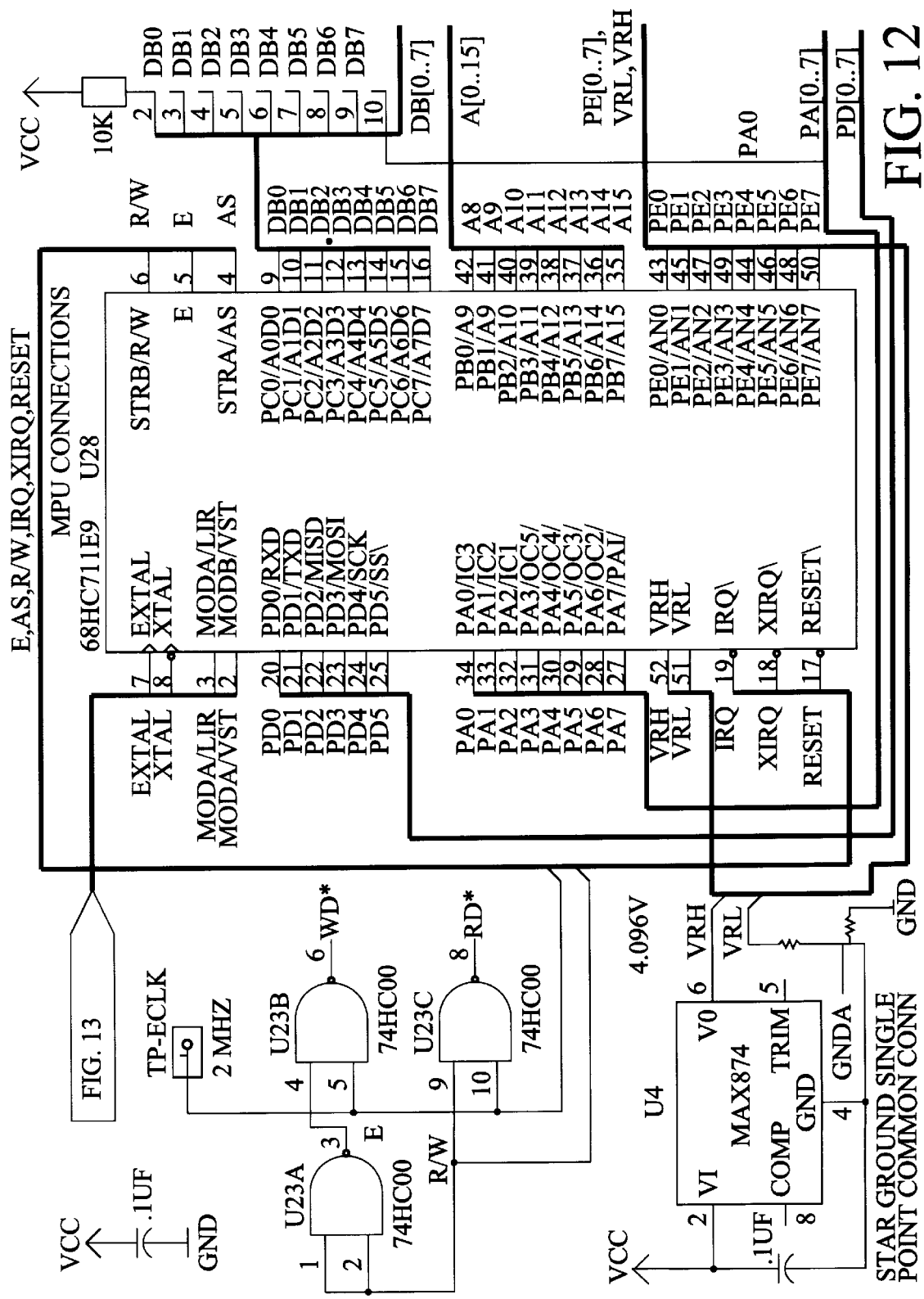
Figure 13:
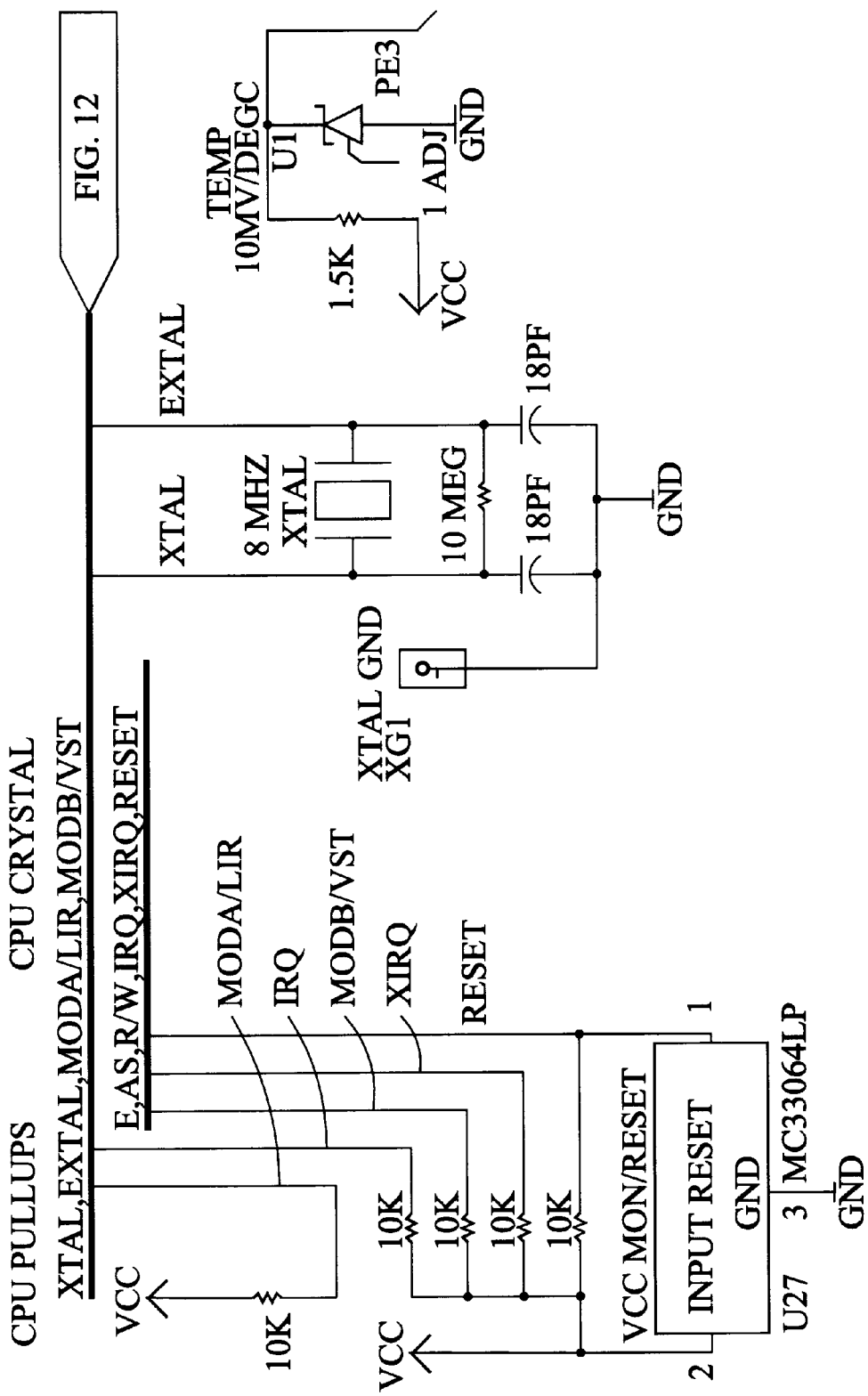
Figure 14:
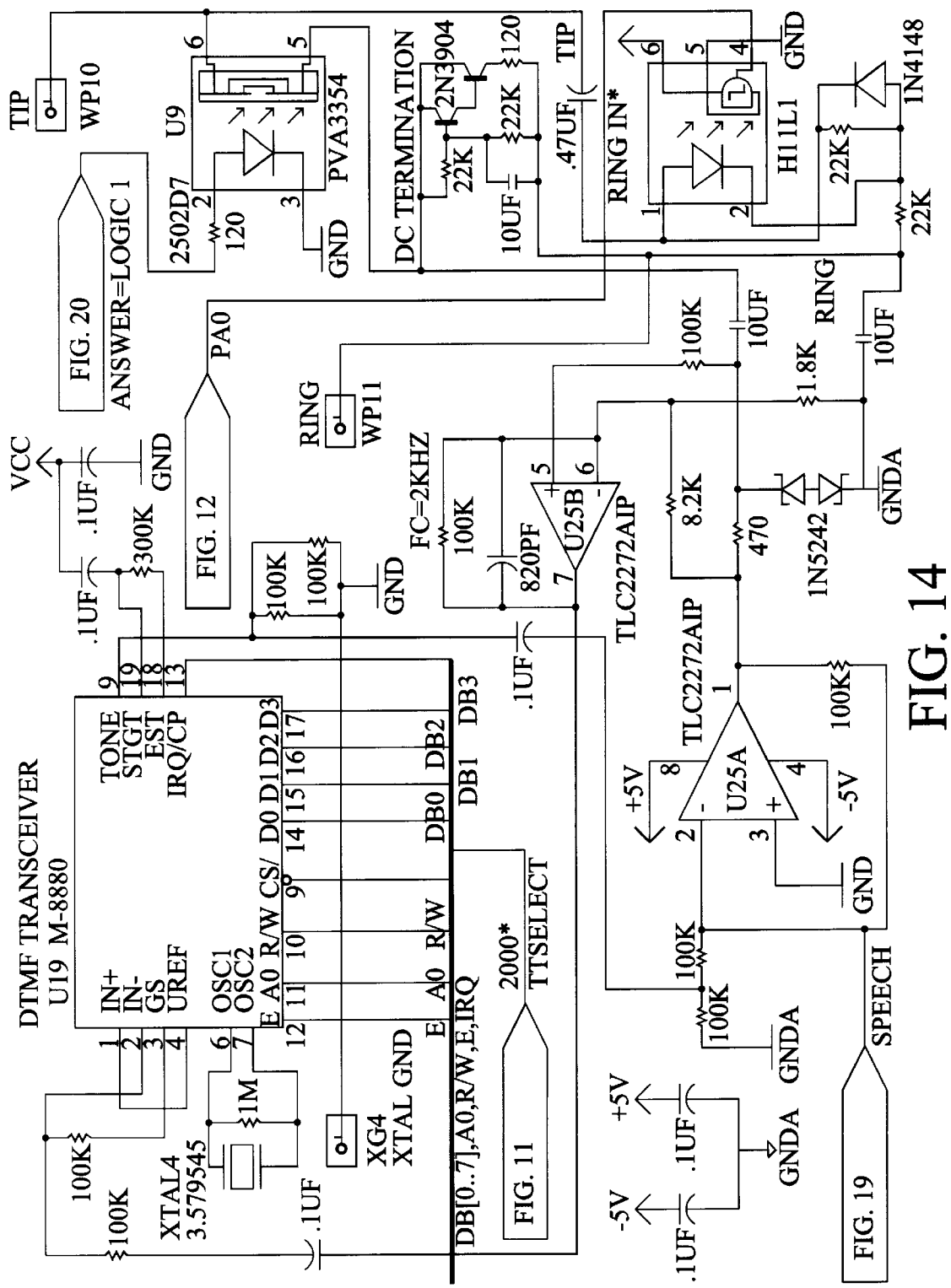
Figure 15:
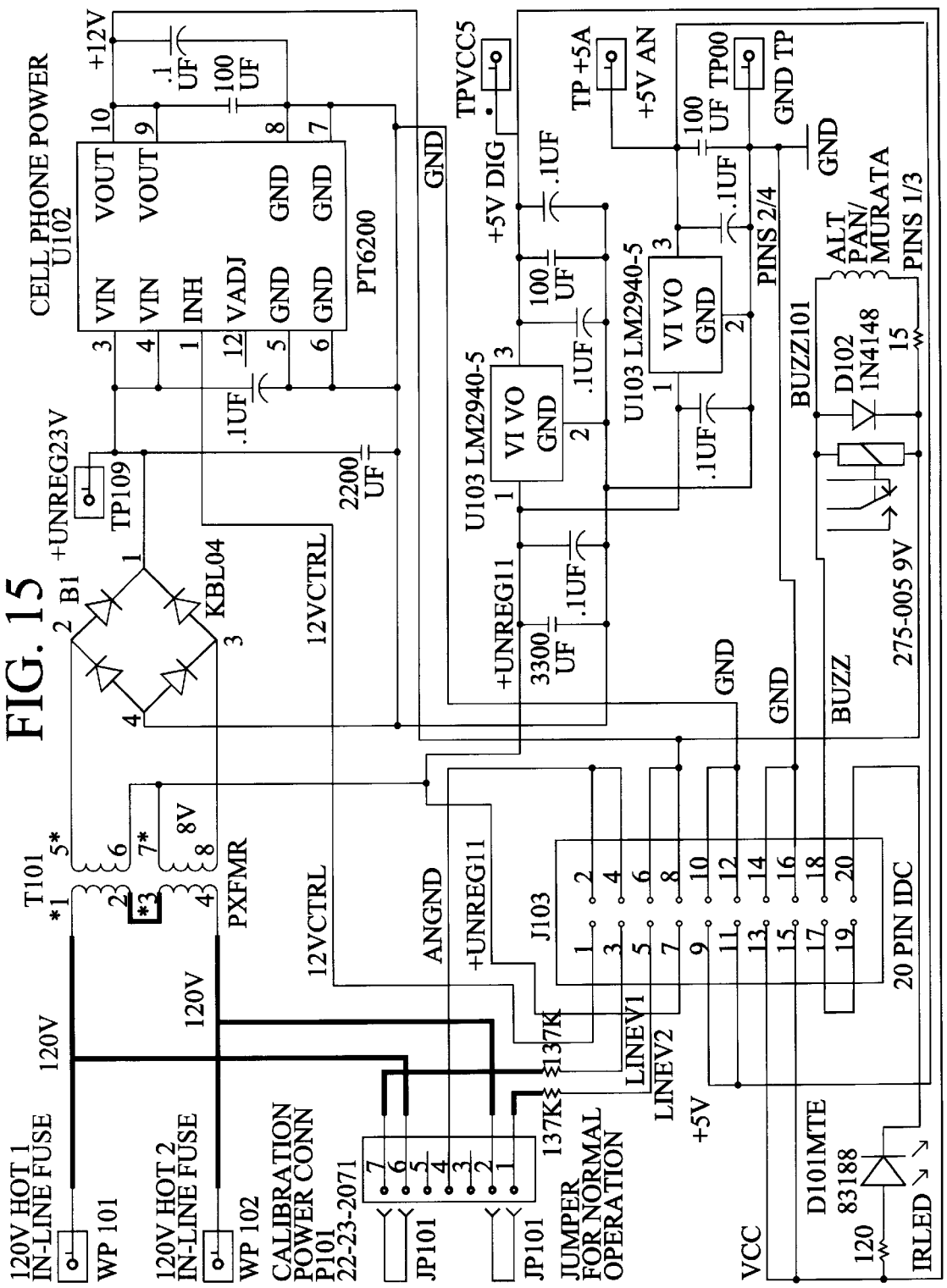
Figure 16:
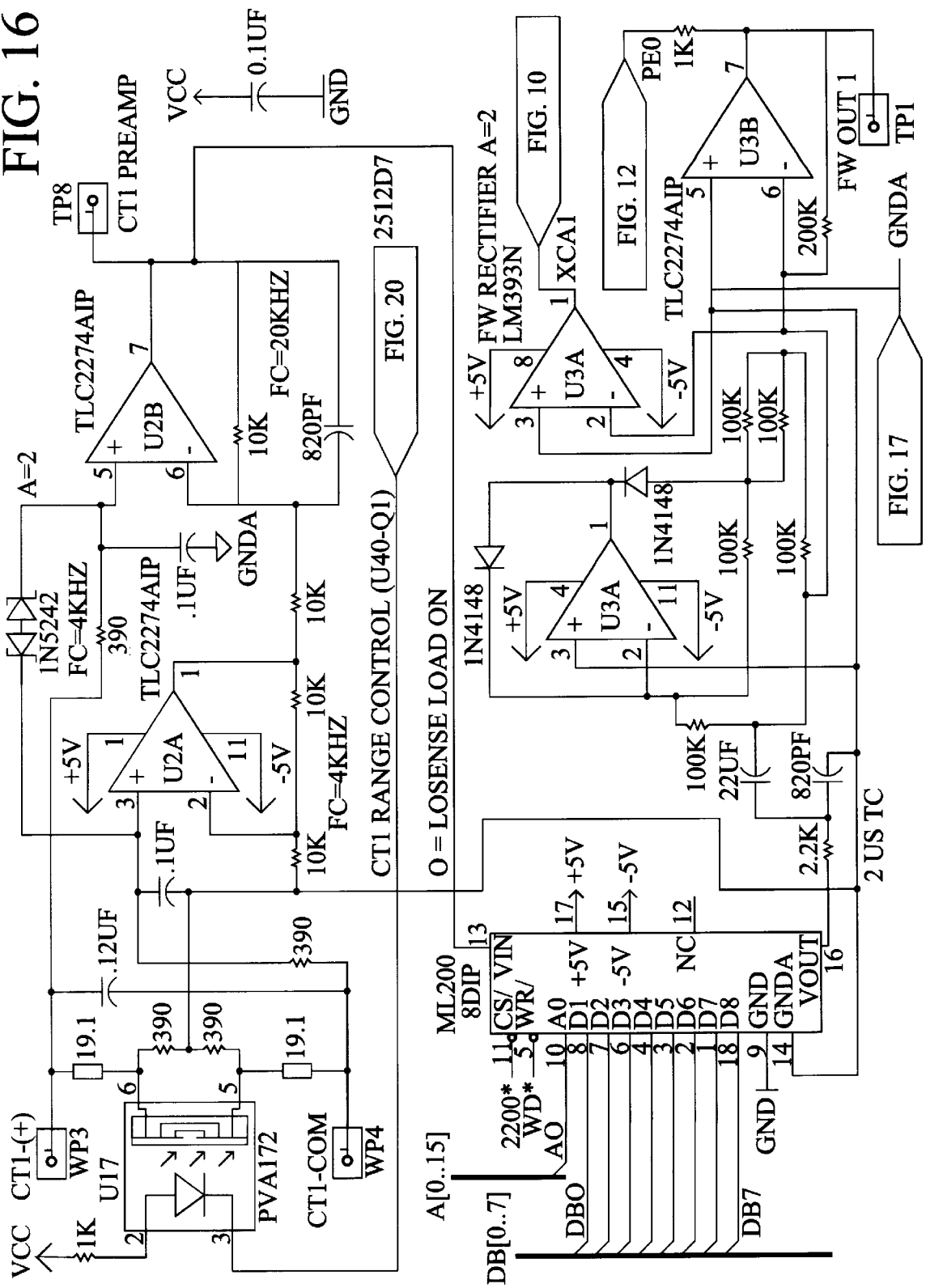
Figure 17:
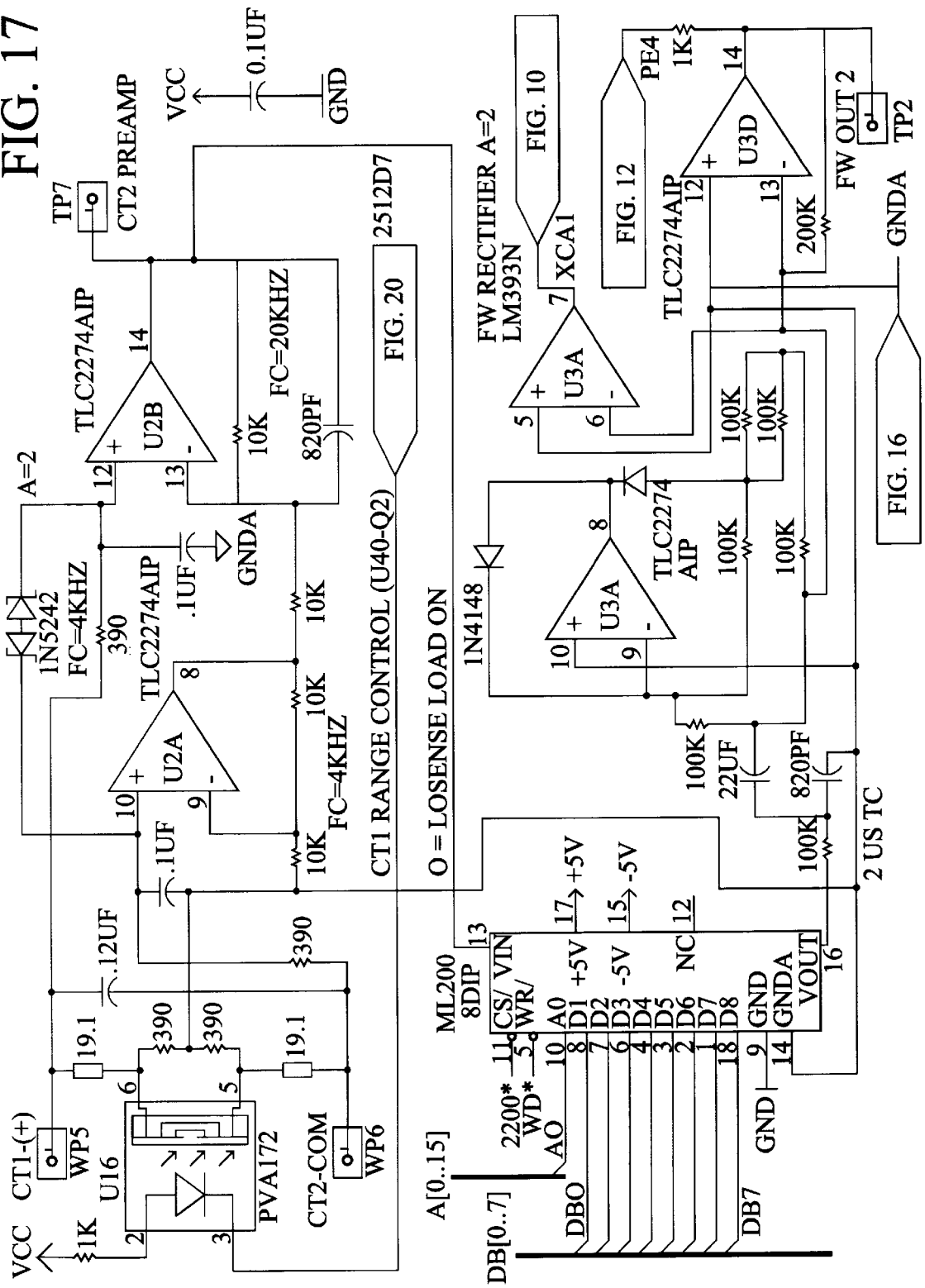
Figure 18:
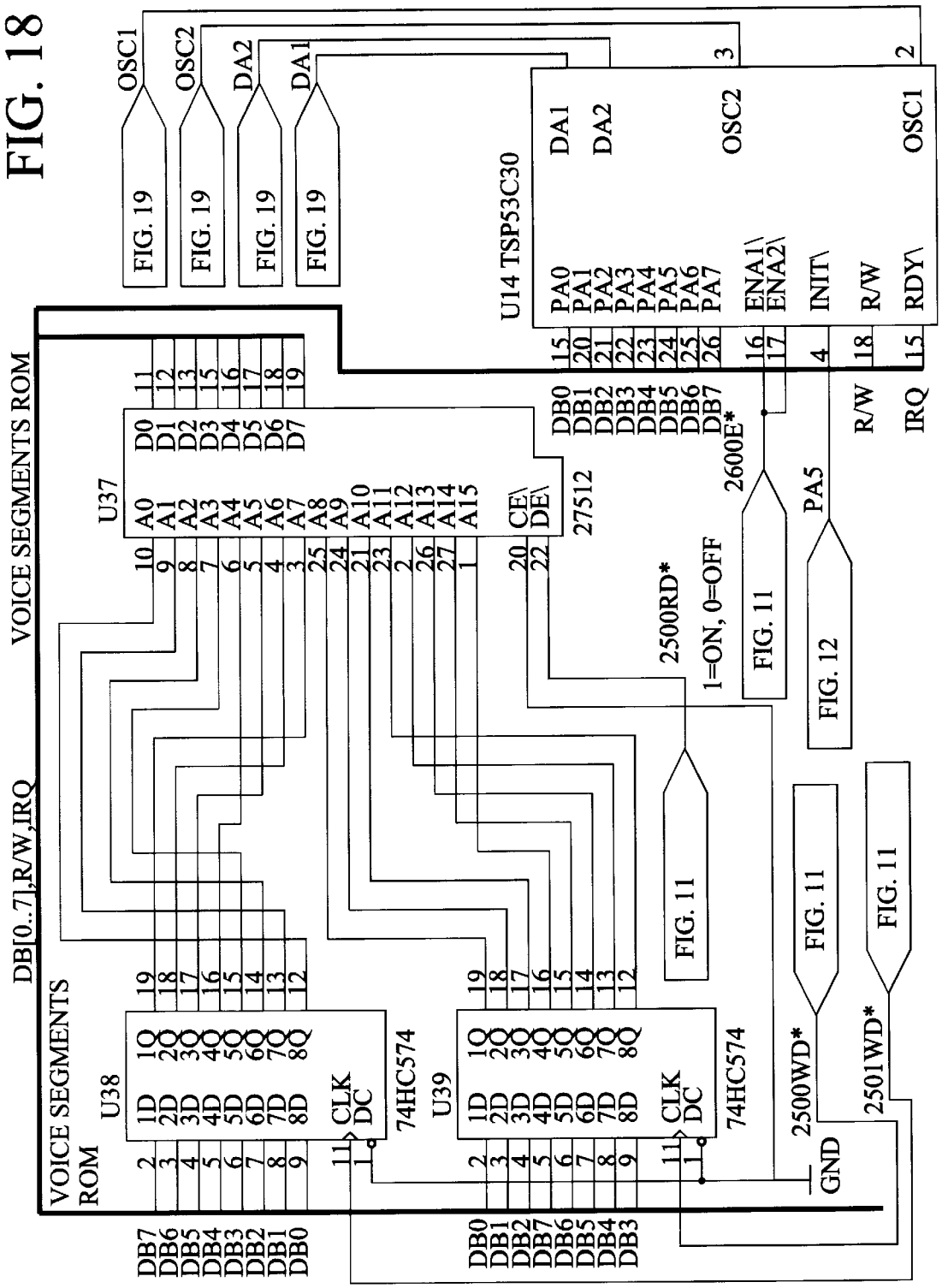
Figure 19:
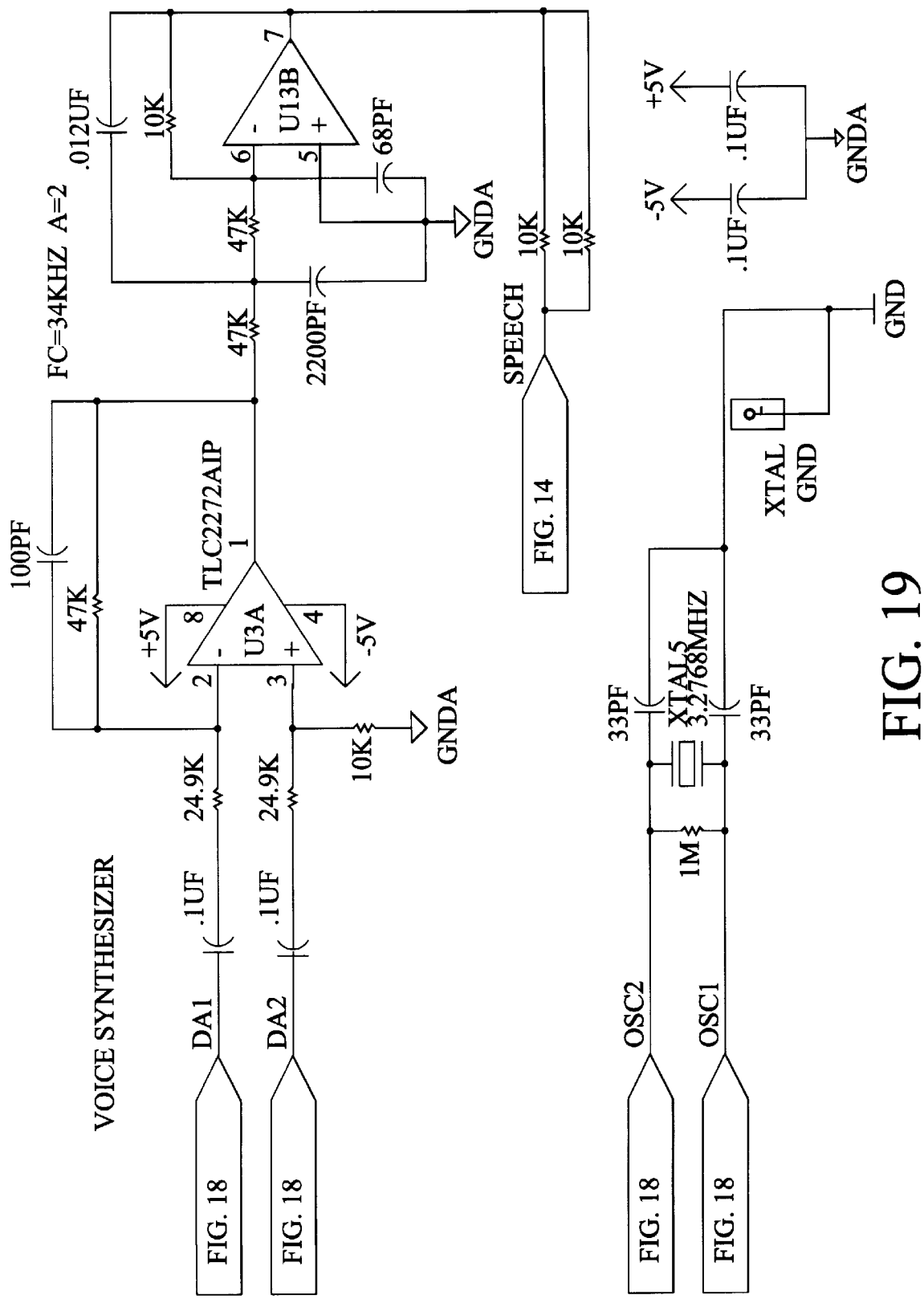
Figure 20:
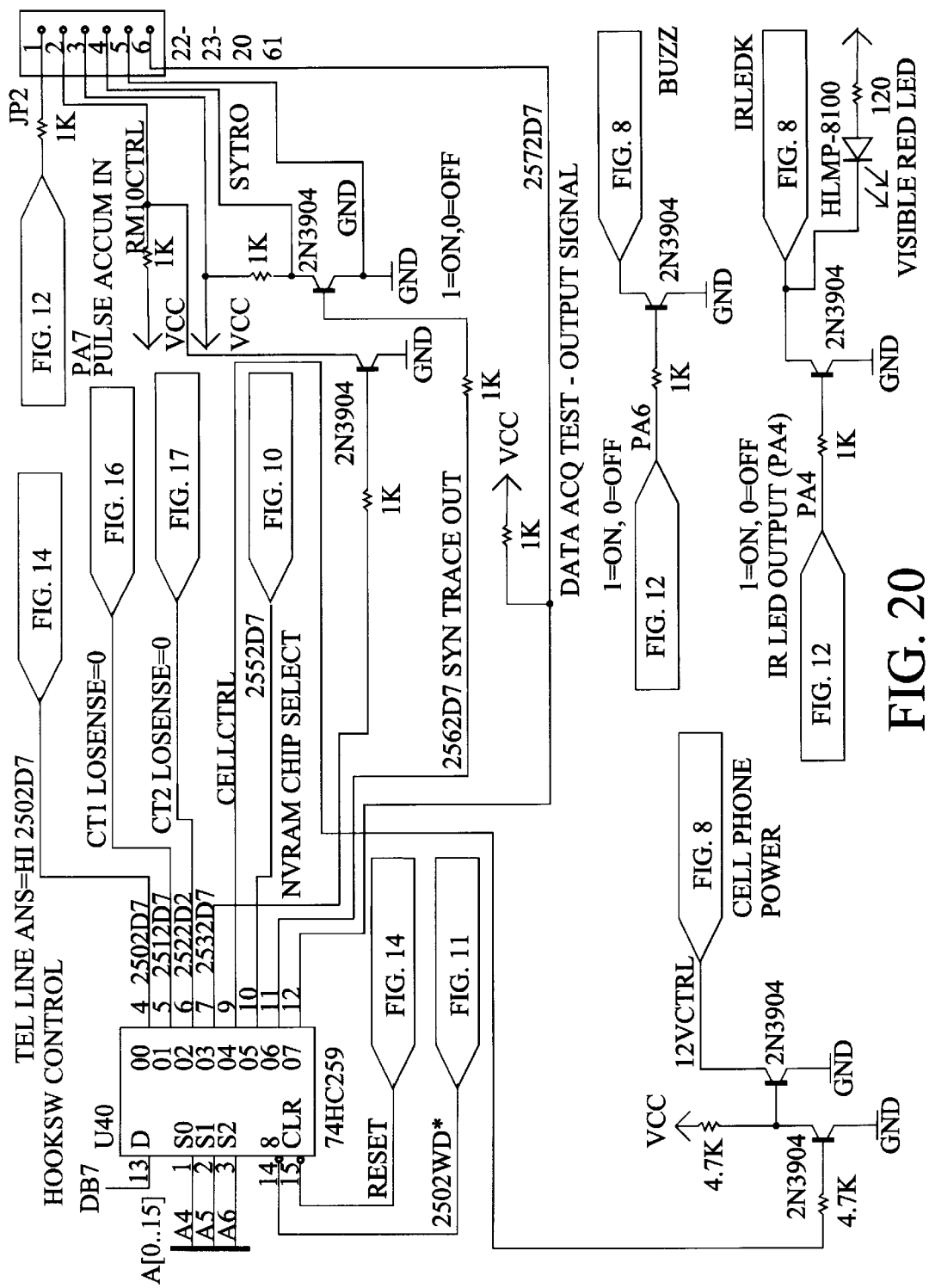

Referring to FIG. 5, the power is more specifically calculated by reconstructing a power wave (Power= Current*Voltage) from a large number of voltage, current, and phase determinations. Each sample taken requires a few bytes to store its voltage, current, and phase values. A high clock rate would be needed to sample the waveform at high rates. In order to reduce the need for high clock speeds and excessive memory to store the samples, the check meter 18 samples multiple cycles and overlays them to obtain a more accurate resultant power usage. Multiple power data samples are obtained in groups, each group measuring at points that are shifted slightly later in time, so as to fill in the gaps between the sample of the previous sample groups. The first data acquisition group, as shown in FIG. 6, obtains the data samples starting at the positive edge of the voltage crossover point, and then proceeds to acquire the next sample just a few hundred microseconds later, until the final sample is near, but, not over the negative going edge of the voltage crossover point. At the negative going edge voltage crossover point, the data sampling begins again, obtaining samples at exactly the same spacing as in the positive half cycle. When the first data acquisition group has finished, the data samples are evaluated and combined into a single partial power usage. The second data acquisition group, as shown in FIG. 7, in like manner obtains its data samples, however, the starting sample is delayed slightly in time from the voltage crossover points. This is to cause the sampling of data to be slightly shifted to later points all across the waveform. When the second data acquisition group has finished, the collected data samples are evaluated and added to the first partial power usage. Preferably 256 samples are obtained across the power wave which may require several cycles. The result has a high degree of accuracy, especially for distorted waveforms and current phase shifting.

The present inventors determined that using a cellular phone transmitter to transmit digital data to the utility 15 is prone to errors due to the inherent limitations of cellular phone transmissions. Also, specialized software, a computer, and a modem are not always available to receive and display the data. The present inventors came to the realization that they could eliminate the digital data transmission limitation, not by including redundant check bits or transmitting the digital data multiple times to the receiving computer, but instead relying on the recognition of the human brain to understand voice or speech even if severely distorted. If a few bits are dropped in the voice pattern or a dropout occurs, the speech pattern is still recognizable by the utility employee. Referring again to FIG. 2, the check meter 18 includes a cellular phone interface 74 which includes cellular phone receiver and transmitter circuitry. The utility employee calls the cellular phone number of the desired check meter 18 and issues in commands by selected combinations of touchtone (DTMF) numbers. The check meter 18 includes a DTMF transceiver (dual-tone multi-frequency) 72 that receives and interprets touchtone inputs from a touchtone phone. In response, the check meter 18 provides the requested data and encodes it using a voice synthesizer 70 in a human voice. The generated voice signals are transmitted to the utility employee using the cell phone interface 74. Alternatively, the measurement system may use any type of telecommunication transmission and reception system that permits the use of voice transmissions.

The utility employee may query the check meter 18 from anywhere that he has access to a phone. Voice synthesis reduces the effects of the dropouts inherent in cellular phone technology because the human brain can interpret voice patterns even if some of the data is missing.

The telephone DTMF commands that may be issued to the check meter 18 include, for example requests for:

(a) date;
(b) repeat last information requested;
(c) current amperage detected;
(d) current voltage detected;
(e) kilowatt-hour reading;
(f) resetable kilowatt-hours;
(g) peak amps;
(h) temperature;
(i) clear resetable kilowatt-hours;
(j) clear peak amps;
(k) begin investigation; and
(l) complete investigation.

The current amperage command for each current transformer 26a and 26b instantly permits the utility 15 to determine if the amperage is unusually high, which could be indicative of when the customer 10 is likely stealing power. The current voltage command for each voltage input 32a and 32b permits the utility 15 to verify that a suitable voltage is being provided to the customer. The peak amps command preferably also includes the date and time so that the utility can tell when the customer 10 is likely stealing power, as described later. Clear peak amps command permits the peak amp reading to be set to zero. The resetable kilowatt-hours command is the same as the kilowatt-hours command, except that the resetable kilowatt-hours can be cleared to zero unlike the kilowatt-hours. During an investigation, described below, the resetable kilowatt hours is used to directly read the kilowatt hours of power consumed during an investigation without having to subtract the previous kilowatt-hour reading from the current kilowatt-hour reading to determine the total power usage.

One method of using the check meter 18 is to first determine if the customer is likely stealing power by noting any difference between the check meter 18 and the power meter 12 readings. Thereafter the utility employee can use the peak amperage command to determine when it is likely that the customer 10 is stealing power. As an example, some customers attempt to steal power when they believe it is less likely that they will be detected, such as during the early morning. During the daytime the customer may simply use a normal amount of power. Accordingly, the utility employee will attempt to determine those times that the amperage or peak amperage is unusually high and attempt to obtain a court order to enter the premises while the customer is likely actually stealing power.

An investigation is an automatic method of obtaining useful information during a period of time. The beginning of an investigation involves the microprocessor 20 (1) saving the time and date, (2) saving the non-resetable kilowatt-hour reading, (3) saving the amps reading, (4) clearing the peak amps reading, and (5) clearing the resetable kilowatt-hour reading. At the end of the investigation period the microprocessor 20 does the following: (1) saves the present time and date, (2) saves the non-resetable kilowatt-hour reading, (3) saves the resetable kilowatt-hour reading, (4) saves the amps reading, and (5) saves the peak amps reading. Upon request, the accumulated data is transmitted to the utility employee.

The actual circuit layout of the check meter 18 is shown in FIGS. 8–20. The check meter could be designed, with minor modifications, for use in a three phase system.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A portable power measurement system for calculating the power flow within at least one wire to a revenue meter of a customer and transmitting an indication of said power flow to a remotely located operator comprising:

(a) a current transformer that senses current within said wire at a location remote from said revenue meter and generates a first output signal;

(b) a voltage input that senses voltage within said wire at a location remote from said revenue meter and generates a second output signal;

(c) a polarity comparator that compares the polarity of said first signal with the polarity of said second signal and generates in response a polarity status signal;

(d) a measurement device that receives said first output signal, said second output signal and said polarity status signal and in response generates a third signal representative of said power flow within said wire;

(e) said measurement device includes a speech encoding circuit that receives said third signal and in response generates a voice signal;

(f) said measurement device includes a cellular telephone transmitter that receives said voice signal and transmits said voice signal through the air, and said voice signal is received by said remotely located operator; and (g) said current transformer, said voltage input, said polarity comparator and said measurement device being housed in a single portable unit for installation at any one of a plurality of locations along said wire.

2. The measurement system of claim 1 wherein said first output voltage is a rectified analog voltage.

3. The measurement system of claim 1 wherein said second output voltage is a rectified analog voltage.

4. The measurement system of claim 1 wherein said current transformer has a split core.

5. The measurement system of claim 1 further comprising a temperature sensor.

6. The power measurement system of claim 1 wherein said polarity comparator further comprises a zero-volt crossover detector that detects the zero voltage level of at least one of said first and second output signals.

7. The power measurement system of claim 6 wherein said crossover detector includes a voltage comparator producing a binary output.

8. The power measurement system of claim 7 further comprising a phase detector that detects when said first and second output values have the same polarity.

9. The power measurement system of claim 8 wherein said phase detector performs an XOR operation on the binary output of said comparator.

10. A method of monitoring the power flow within a wire interconnecting a power utility to a customer where one end of said wire at said customer has an electric usage revenue meter connected thereto to record the electrical power used from the power utility, comprising the steps of:

(a) sensing current with said wire at a remote location between said power utility and said revenue meter independently of said revenue meter and generating a first output signal:

(b) sensing voltage within said wire and generating a second output signal;

(c) receiving in a measurement device remotely located from said revenue meter and said customer both said first output signa and said second output signal and in response generating a third signal representative of said power flow within said wire;

(d) encoding within said measurement device said third signal as a voice signal;

(e) receiving at a cellular telephone transmitter within said measurement device said voice signal and in response transmitting said voice signal to a remotely located operator; and (f) calculating said power flow within said wire in response to said voice signal and comparing said power flow within said wire with the electrical power recorded by said revenue meter;

(g) comparing the polarity of said first output signal with the polarity of said second output signal, and in response thereto inverting at least one of said first output signal and said second output signal when the polarities of said signal are different.

11. The method of claim 10 wherein said measurement device is located proximate to a utility pole.

12. The method of claim 10 wherein said first output voltage is a rectified analog voltage.

13. The method of claim 10 wherein said second output voltage is a rectified analog voltage.

14. The method of claim 10 further comprising the step of sensing the temperature and adjusting the measurement device to compensate for changes in said temperature.

15. The method of claim 10 further comprising the step of sensing the zero-voltage level of at least one of said first and second output signals and producing a binary output as a result of said sensing said zero-voltage level.

16. The method of claim 15 further comprising detecting when said first and second output values have the same polarity based on said binary output.

17. The method of claim 16 wherein polarity is detected by performing an XOR operation on said binary output.

18. The method of claim 17 further comprising the step of obtaining multiple sets of said first and second output signals for each cycle of at least one of said current and said voltage within said wire where each of said sets is offset to obtain a combined set of data for a single said cycle with more data points than one of said multiple sets.

* * * * *